United States Patent
Miura et al.

(10) Patent No.: US 8,792,943 B2
(45) Date of Patent: Jul. 29, 2014

(54) PORTABLE ELECTRONIC EQUIPMENT AND CHARACTER INFORMATION CONVERSION SYSTEM

(75) Inventors: Atsushi Miura, Kanagawa (JP); Yasumasa Sekigami, Kanagawa (JP); Shuuji Ishikawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 144 days.

(21) Appl. No.: 13/387,601

(22) PCT Filed: Jul. 26, 2010

(86) PCT No.: PCT/JP2010/062516
§ 371 (c)(1),
(2), (4) Date: Apr. 6, 2012

(87) PCT Pub. No.: WO2011/013614
PCT Pub. Date: Feb. 3, 2011

(65) Prior Publication Data
US 2012/0190407 A1    Jul. 26, 2012

(30) Foreign Application Priority Data
Jul. 29, 2009   (JP) .................................. 2009-176364

(51) Int. Cl.
*H04B 1/38*    (2006.01)
*G06F 17/27*   (2006.01)
(52) U.S. Cl.
CPC ...... *G06F 17/276* (2013.01); *G06F 2213/0038* (2013.01); *H04M 2250/70* (2013.01)
USPC .......... 455/563; 455/566; 455/466; 455/414.1
(58) Field of Classification Search
USPC ............... 455/563, 566, 466, 414.1
See application file for complete search history.

(56) References Cited

U.S. PATENT DOCUMENTS

| 2001/0003826 | A1 | 6/2001 | Iwata |
| 2002/0049793 | A1* | 4/2002 | Okumura et al. ............. 707/526 |

(Continued)

FOREIGN PATENT DOCUMENTS

| JP | 2001-155014 A | 6/2001 |
| JP | 2003-030178 A | 1/2003 |
| JP | 2004-096454 A | 3/2004 |
| JP | 2007-156888 A | 6/2007 |

OTHER PUBLICATIONS

International Search Report for PCT/JP2010/062516, mailed Oct. 19, 2010.

(Continued)

*Primary Examiner* — Barry Taylor
(74) *Attorney, Agent, or Firm* — Hoffmann & Baron, LLP

(57) ABSTRACT

Provided is portable electronic equipment capable of mutually converting character information and simplified character information. The portable electronic equipment is equipped with a display unit; a character information acquisition unit that acquires character information; a trigger signal detection unit that detects a prescribed trigger signal; a character information conversion unit that simplifies character information by extracting sentence elements from the character information and rearranging the sentence elements into a prescribed order or simplifies the character information by replacing prescribed words in the character information with symbols pertaining to said words, when the trigger signal is detected by the trigger signal detection unit; and a display control unit that displays on the display unit the character information simplified by the character information conversion unit.

1 Claim, 11 Drawing Sheets

(56) References Cited

U.S. PATENT DOCUMENTS

| | | |
|---|---|---|
| 2004/0216047 A1 | 10/2004 | Iwata |
| 2005/0107127 A1* | 5/2005 | Moriya ........................ 455/566 |
| 2005/0267761 A1* | 12/2005 | Ueno ........................... 704/277 |
| 2008/0300012 A1* | 12/2008 | An ............................ 455/556.1 |
| 2009/0124272 A1* | 5/2009 | White et al. ................. 455/466 |
| 2009/0153341 A1* | 6/2009 | Spalink ........................ 340/669 |
| 2010/0131900 A1* | 5/2010 | Spetalnick ................... 715/825 |

OTHER PUBLICATIONS

Notice of Reasons for Rejection issued to JP Application No. 2009-176364, mailed Sep. 3, 2013.

* cited by examiner

FIG. 3A

From    Company X
Sub   Invitation to seminar

Dear staff in department 2,
A seminar will be held by the union today.
Mr. XX who is well-known to TV audience will appear in this seminar.
The seminar will start from 18:00 in the conference room A.
The seminar will end at 20:00.
We welcome everyone.

REPLY | EDIT | MENU

FIG. 3B

From    Company X
Sub   Invitation to seminar

When: 18:00 today
Where: Conference room A
Who: Union
What: Seminar to be held

Dear staff in department 2.
A seminar will be held by the union today.
Mr. XX who is well-known to TV audience will appear in this seminar.
The seminar will start from 18:00 in the conference room A.

REPLY | EDIT | MENU

FIG. 3C

SCHEDULE REGISTRATION

Title
Start time   2009/04/01 18:00
Finish time  2009/04/01 20:00
Place        Conference room A
Contents     A seminar will be held by the union.

RETURN | REGISTER | EDIT

SHAKE IN LATERAL DIRECTION

SHAKE IN LONGITUDINAL DIRECTION

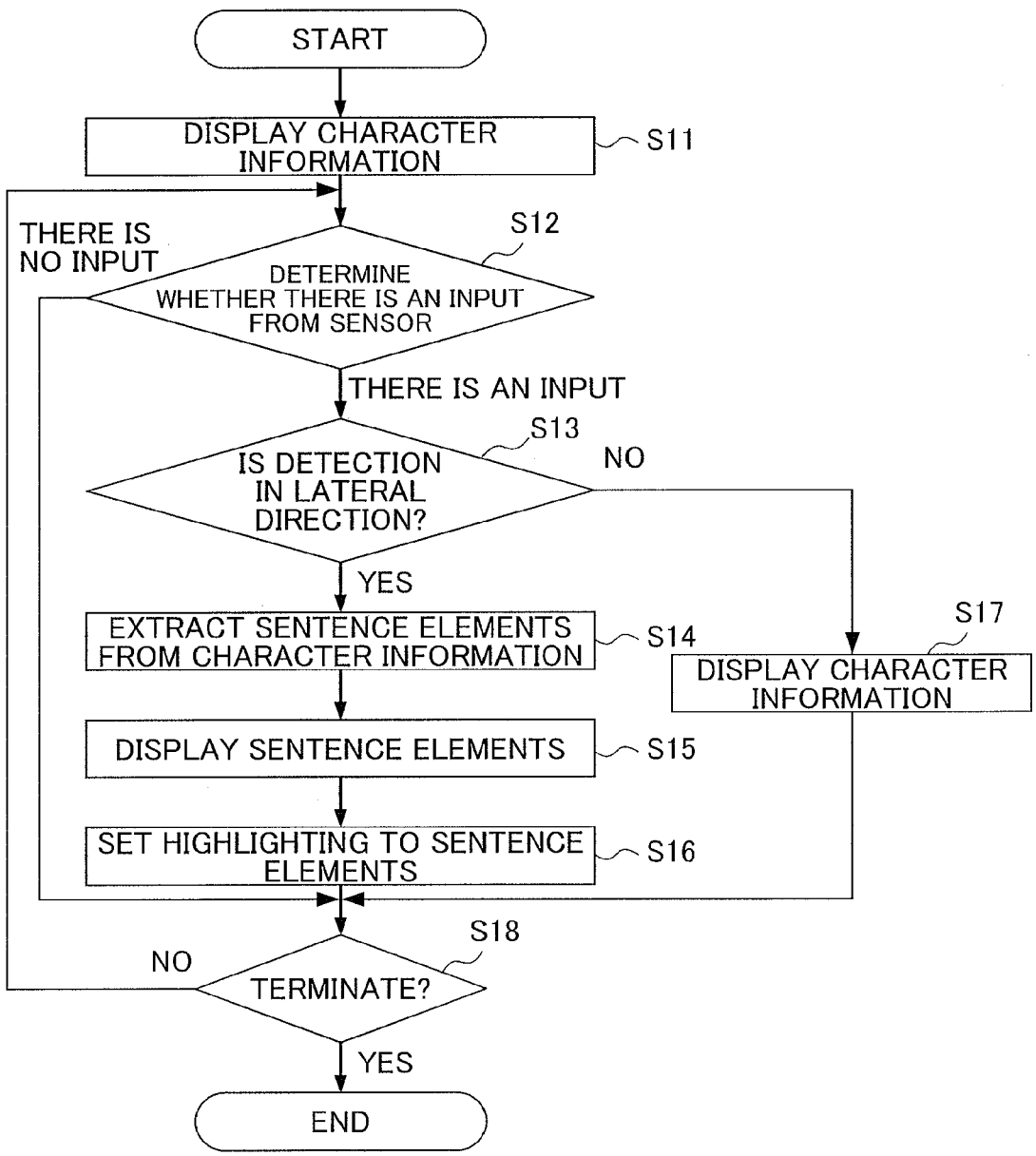

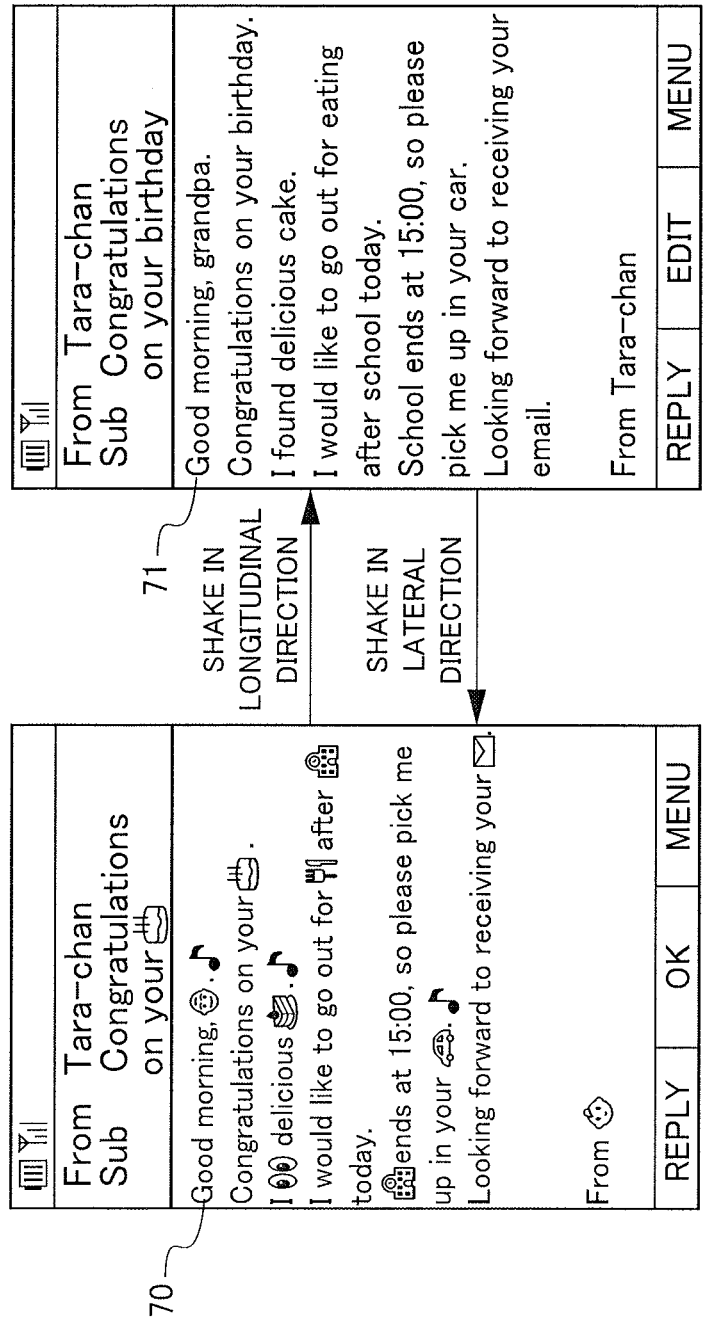

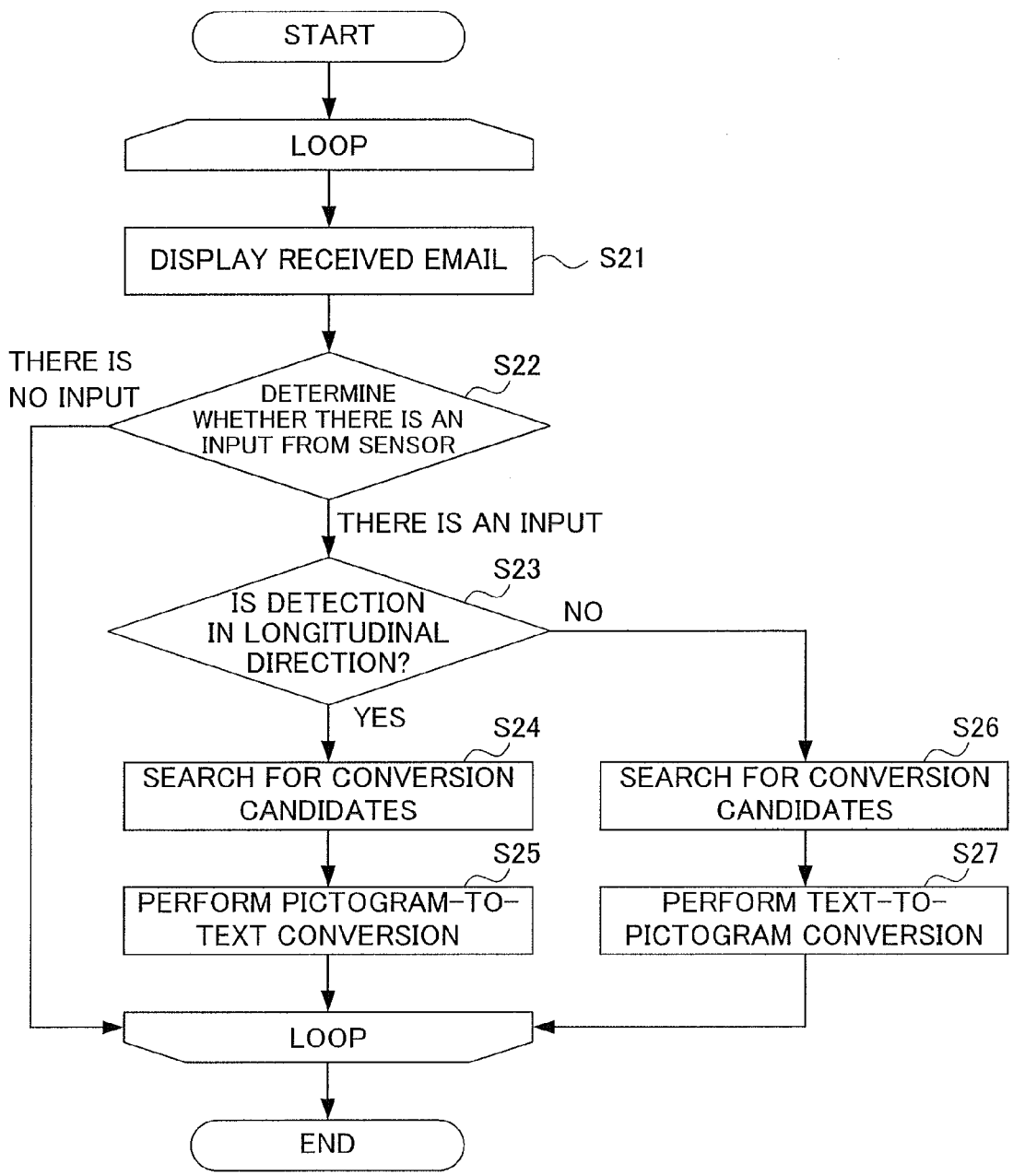

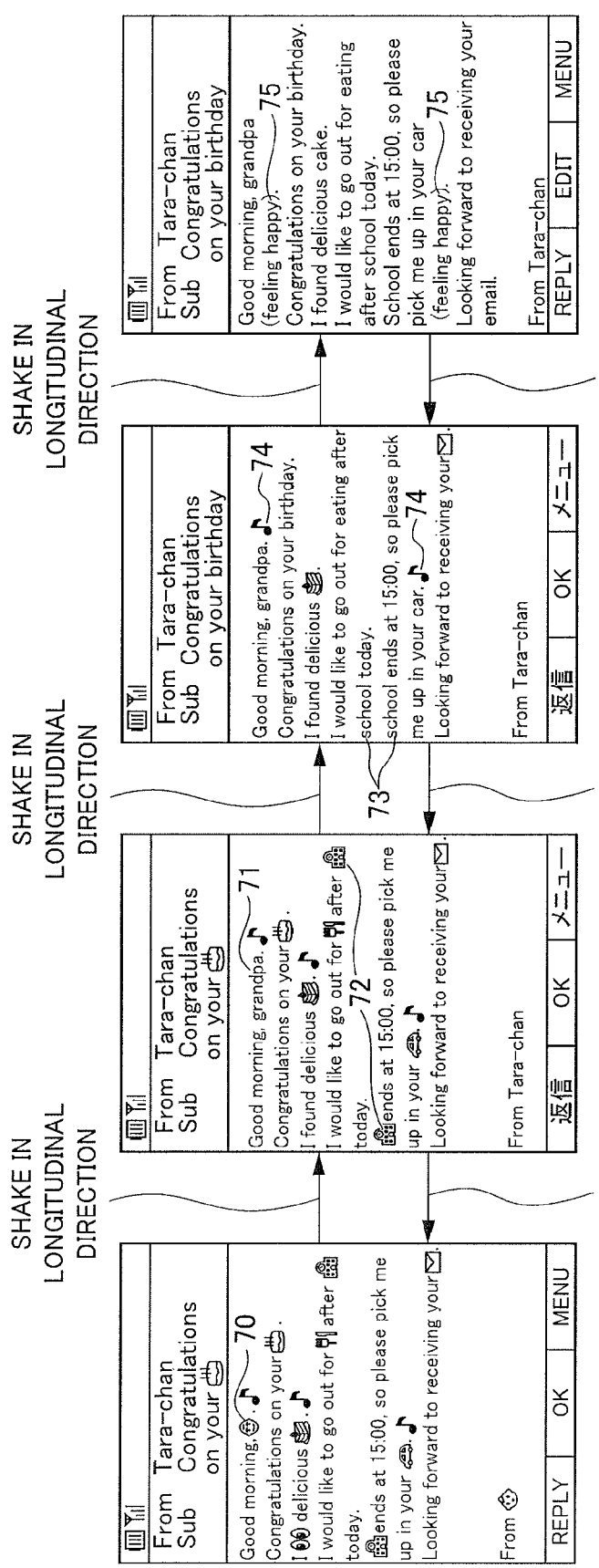

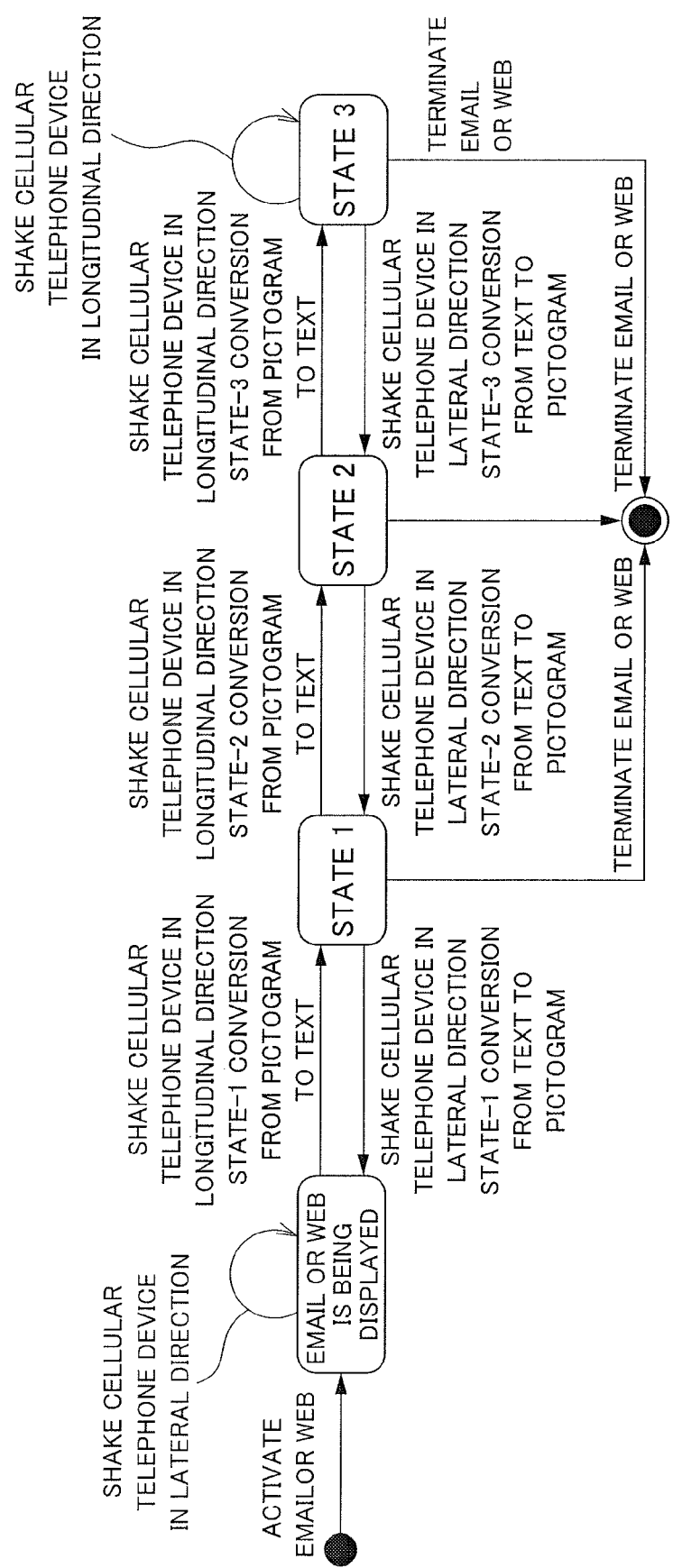

FIG. 10A

STATE-1 CONVERSION TABLE

| PICTOGRAM CODE | TEXT |
|---|---|
| E4D0 | CAKE |
| E5A4 | FOUND |
| EB16 | GRANDPA |
| EB17 | GRANDMA |
| EB18 | GRANDCHILD |
| EB19 | FIELD OVERSEER |
| EB1A | PRINCESS |
| EB26 | BLOOD TYPE A |
| EB27 | BLOOD TYPE B |
| EB28 | BLOOD TYPE O |
| EB29 | BLOOD TYPE AB |

FIG. 10B

STATE-2 CONVERSION TABLE

| PICTOGRAM CODE | TEXT |
|---|---|
| E5DE | POST OFFICE |
| E5DF | HOSPITAL |
| EA80 | SCHOOL |
| EA81 | HOTEL |
| EA90 | SILENT MODE |
| E4AC | EAT |
| E51D | NAME TAG |
| E4CF | PRESENT |
| E4B2 | TRUCK |
| E586 | LOGO |
| E4AD | FACTORY |

FIG. 10C

STATE-3 CONVERSION TABLE

| PICTOGRAM CODE | TEXT |
|---|---|
| E5BE | FEELING HAPPY |
| E566 | BOOK |
| E567 | TEXTBOOK |
| E56A | CALENDAR |
| E521 | EMAIL |
| E4AB | HOUSE |
| E55C | NEXT |
| E55D | RETURN |
| E550 | STOP |
| E481 | SERIOUS ATTENTION |
| E482 | ATTENTION |

PORTABLE ELECTRONIC EQUIPMENT AND CHARACTER INFORMATION CONVERSION SYSTEM

CROSS-REFERENCE TO RELATED APPLICATIONS

This application is the National Stage of International Application No. PCT/JP2010/062516, filed Jul. 26, 2010, which claims the benefit of Japanese Application No. 2009-176364, filed Jul. 29, 2009, the entire contents of both of which are incorporated by reference herein.

FIELD OF THE INVENTION

The present invention relates to a portable electronic device and a character information conversion system, which convert character information in accordance with an operation by a user.

BACKGROUND OF THE INVENTION

Some cellular telephone devices have a function in which, when transmitting email, pictograms that are included in the subject and text of the email are automatically converted into character strings corresponding to the meanings of the pictograms, depending on the domain names of a destination mail address and an originating mail address (see Patent Document 1).
Patent Document 1: Japanese Unexamined Patent Application, Publication No. 2004-96454

SUMMARY OF THE INVENTION

Problems to be Solved by the Invention

However, the invention disclosed in Patent Document 1 is utilized in a case in which the destination cellular telephone device and the originating cellular telephone device belong to different communication common carriers, respectively. Therefore, the invention disclosed in Patent Document 1 is not an invention, in which, in a single cellular telephone device, when a pictogram is included in a sentence, the pictogram is converted into a character string corresponding to the meaning of the pictogram, and when a pictogram is not included in the sentence, a predetermined character string in the sentences is converted into a pictogram corresponding to the predetermined character string, thereby converting such a sentence into a sentence that would satisfy the user's preference.

An object of the present invention is to provide a portable electronic device and a character information conversion system, which are capable of bi-directionally converting character information and simplified character information.

Means for Solving the Problems

The present invention relates to a portable electronic device that includes: a display unit; a character information acquisition unit that acquires character information; a character information converter, which simplifies the character information by extracting sentence elements from the character information and sorting the sentence elements in a predetermined order, or which simplifies the character information by replacing a predetermined word included in the character information with a symbol associated with the word; and a display control unit that displays simplified character information simplified by the character information converter on the display unit.

In addition, the display control unit preferably displays the character information acquired by the character information acquisition unit, together with the simplified character information, on the display unit.

Furthermore, the display control unit preferably displays the simplified character information in a font size that is larger than a font size of the character information acquired by the character information acquisition unit, on the display unit.

Moreover, the portable electronic device preferably further includes: a speech converter that converts the character information and the simplified character information into speech information; and a speech information output unit that outputs the speech information.

Furthermore, the portable electronic device preferably further includes: a storage unit that stores the predetermined word and the symbol to be associated with each other; and a determination unit that determines whether the predetermined word is included in the character information acquired by the character information acquisition unit, in which, in a case in which the determination unit determines that the predetermined word is included in the character information, the character information converter preferably reads the symbol corresponding to the predetermined word from the storage unit, and preferably replaces the predetermined word included in the character information with the symbol.

Moreover, the portable electronic device preferably further includes: a storage unit that stores a schedule book, a memo pad or an address book; and a registration control unit that registers the simplified character information with the schedule book, the memo pad or the address book stored in the storage unit.

In addition, the display unit preferably displays simplified character information simplified by the character information converter, and at least a part of selection candidates for selecting processing details associated with the character information.

Furthermore, the processing details preferably include any one of: a function of editing the character information; a function of transmitting the character information or character information edited from the character information through an email function; and a text-to-speech reading function of reading character information as speech.

Moreover, the present invention relates to a portable electronic device that includes: a display unit; a character information acquisition unit that acquires simplified character information simplified by sorting sentence elements in a predetermined order, or acquires simplified character information simplified by replacing a predetermined word with a symbol associated with the word; a trigger signal detecting unit that detects a predetermined trigger signal; a character information converter that converts the simplified character information composed of the sentence elements, or the simplified character information in which the predetermined word is replaced with the symbol, into character information composed of a sentence, in a case in which the trigger signal detecting unit detects the trigger signal; and a display control unit that displays the character information composed of the sentence converted by the character information converter on the display unit.

In addition, the character information converter preferably has a plurality of patterns of conversion information to be used when the simplified character information composed of the sentence elements is converted into the character information composed of the sentence, and the character information converter preferably converts a simplified sentence into the character information composed of the sentence, based on the conversion information of a single pattern selected from the plurality of patterns.

Furthermore, in a case in which a message is included in the simplified character information, after the character information converter converts the simplified character information into the character information composed of the sentence, the display control unit preferably displays the message together with the character information composed of the sentence on the display unit.

Moreover, the display unit preferably displays character information composed of the sentence converted by the character information converter, and at least a part of selection candidates for selecting processing details associated with the character information.

In addition, the processing details preferably include any one of: a function of editing the character information; a function of transmitting the character information or character information edited from the character information through an email function; and a text-to-speech reading function of reading character information as speech.

Furthermore, the portable electronic device preferably further includes: a body; and an acceleration sensor that detects acceleration applied to the body, in which the character information converter preferably performs conversion of the character information, upon detection of acceleration in a predetermined direction as a trigger.

Moreover, the portable electronic device preferably further includes: a detecting body; and a contact sensor that detects a moving direction of an external object moving on a surface of the detecting body, in which the character information converter preferably performs conversion of the character information, upon detection of a predetermined direction as a trigger.

In addition, the portable electronic device preferably further includes a speech recognition unit, which recognizes sound when the sound is input, and which converts the sound into text data, in which the character information converter performs conversion of the character information, based on a fact that the text data includes predetermined text, as a trigger.

Furthermore, the present invention relates to a portable electronic device that includes: a display unit; a character information acquisition unit that acquires character information; a trigger signal detecting unit that detects a predetermined first trigger signal and a predetermined second trigger signal, in which, in a case in which the trigger signal detecting unit detects the first trigger signal, first character information composed of a sentence acquired by the character information acquisition unit is converted into second simplified character information by sorting sentence elements in a predetermined order, or the first character information is converted into third simplified character information by replacing a predetermined word with a symbol associated with the word; a character information converter that converts the second character information or the third character information into the first character information, in a case in which the trigger signal detecting unit detects the second trigger signal; and a display control unit that displays any one of the first to third character information that has been converted by the character information converter.

Moreover, the portable electronic device preferably further includes a trigger signal input unit, which inputs the first trigger signal into the trigger signal detecting unit based on displacement in a first direction, and which inputs the second trigger signal into the trigger signal detecting unit based on displacement in a second direction different from the first direction.

In addition, the present invention relates to a character information conversion system that includes an external arithmetic unit, a terminal unit, an external arithmetic unit side communication unit, and a portable electronic device side communication unit, in which the system includes: a display unit that is provided to the terminal unit; a character information acquisition unit, which is provided to the terminal unit, and which acquires character information; a trigger signal detecting unit, which is provided to the terminal unit, and which detects a predetermined trigger signal; a character information converter that is provided to the external arithmetic unit, wherein, in a case in which the trigger signal detecting unit detects the trigger signal, the character information converter simplifies the character information by extracting sentence elements from the character information and sorting the sentence elements in a predetermined order, or the character information converter simplifies the character information by replacing a predetermined word included in the character information with a symbol associated with the word; and a display control unit, which is provided to the terminal unit, and which displays character information simplified by the character information converter on the display unit.

Furthermore, the present invention relates to a character information conversion system that includes an external arithmetic unit, a terminal unit, an external arithmetic unit side communication unit, and a portable electronic device side communication unit, in which the system includes: a display unit that is provided to the terminal unit; a character information acquisition unit, which is provided to the terminal unit, and which acquires simplified character information simplified by sorting sentence elements in a predetermined order, or acquires simplified character information simplified by replacing a predetermined word with a symbol associated with the word; a trigger signal detecting unit, which is provided to the terminal unit, and which detects a predetermined trigger signal; a character information converter, which is provided to the external arithmetic unit, and which converts the simplified character information composed of the sentence elements, or the simplified character information in which the predetermined word is replaced with the symbol, into character information composed of a sentence, in a case in which the trigger signal detecting unit detects the trigger signal; and a display control unit, which is provided to the terminal unit, and which displays the character information composed of the sentence converted by the character information converter on the display unit.

Effects of the Invention

According to the portable electronic device and the character information conversion system of the present invention, the character information and the simplified character information can be converted bi-directionally.

BRIEF DESCRIPTION OF THE DRAWINGS

FIG. 3 is a view showing operations of the cellular telephone device in a case in which the cellular telephone device is shaken in predetermined directions in a state where received email is displayed on a display unit;

FIG. 4 is a flowchart showing operations of the cellular telephone device of the first embodiment;

FIG. 6 is a view showing operations of the cellular telephone device in a case in which the cellular telephone device is shaken in predetermined directions in a state where the received email is displayed on the display unit;

FIG. 7 is a flowchart showing operations of the cellular telephone device of the second embodiment;

FIG. 8 is a view showing operations of the cellular telephone device in a case in which the cellular telephone device is shaken in predetermined directions a plurality of times;

FIG. 9 is a state transition diagram when converting characters/pictograms in a case of setting conversion levels at a plurality of stages;

FIG. 10 is a diagram showing pictogram/word conversion tables; and

Figure 1:
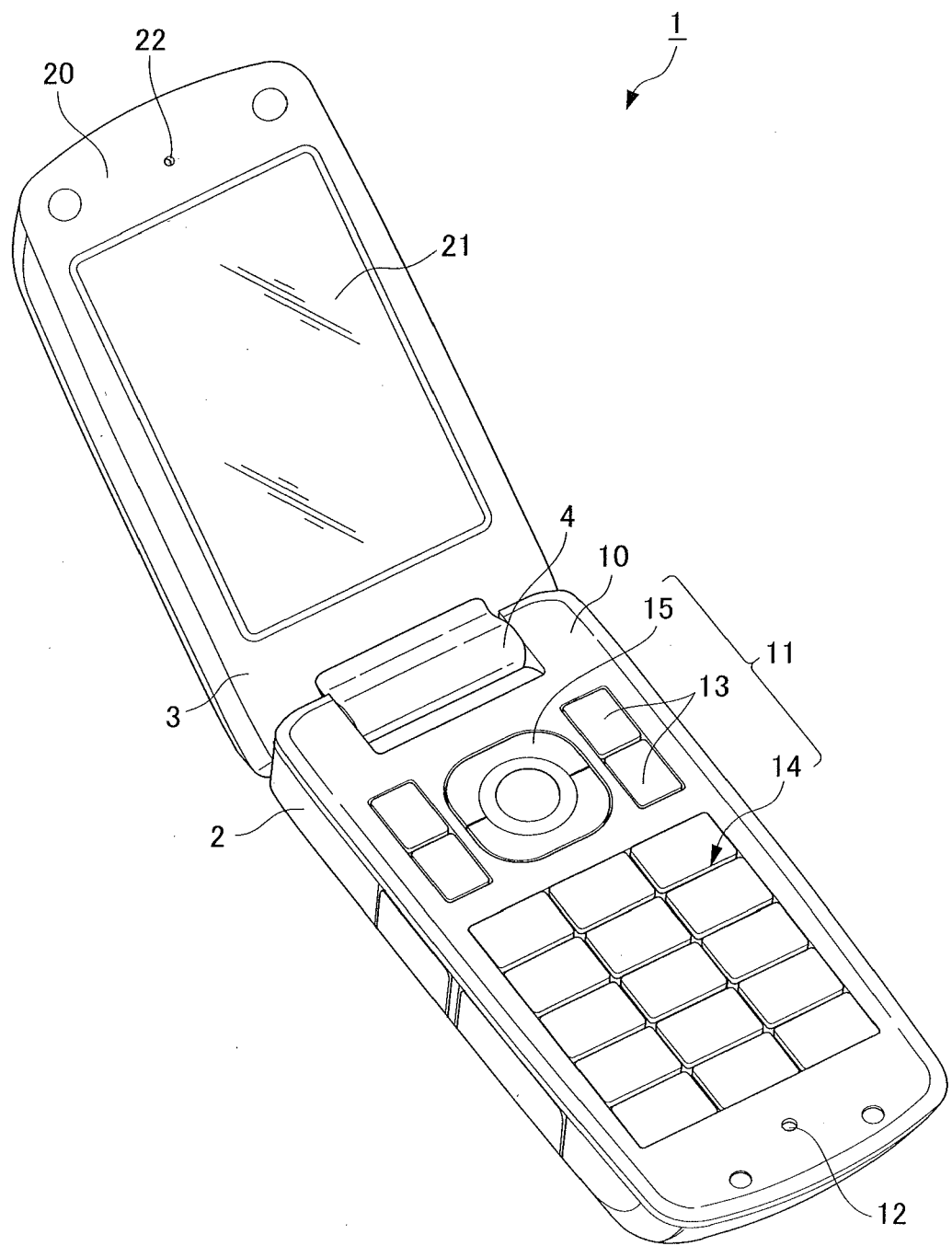
FIG. 1 is a perspective view showing an appearance of a cellular telephone device according to a first embodiment of the present invention.

EXPLANATION OF REFERENCE NUMERALS 1 cellular telephone device (portable electronic device)
21 display unit
30 input unit
40 control unit
41 character information acquisition unit
42 trigger signal detecting unit
43 character information converter
44 display control unit
48 determination unit
49 character information converter
51 acceleration sensor
60 storage unit
101 external arithmetic unit
143 character information converter

DETAILED DESCRIPTION OF THE INVENTION

First Embodiment

First of all, with reference to FIG. 1, descriptions are provided for a basic structure of a cellular telephone device 1 according to a first embodiment of the portable electronic device of the present invention. FIG. 1 is a perspective view showing an appearance of the cellular telephone device 1 according to the first embodiment of the present invention;

The cellular telephone device 1 includes an operation unit side body 2 and a display unit side body 3 as bodies, as well as a hinge mechanism 4 that connects the display unit side body 3 and the operation unit side body 2.

The operation unit side body 2 is configured to include an operation unit 11 and a microphone 12 on a front face 10. The front face 10 of the operation unit side body 2 is a face that faces the display unit side body 3 in a state where the cellular telephone device 1 is folded.

The operation unit 11 is configured with: function setting operation keys 13 for operating various functions such as for various settings, a dictionary function and an email function; input operation keys 14 for inputting digits and characters; and a selection operation key 15 for performing selection of various operations, scrolling, etc.

The microphone 12 is used for inputting sound produced by the user of the cellular telephone device 1 during a telephone call.

Moreover, an imaging unit 32 (see FIG. 2) is provided on a rear face (not shown) of the operation unit side body 2. The imaging unit 32 is used for acquiring image information from outside.

The display unit side body 3 is configured to include a display unit 21 and a receiver 22 on a front face 20. The front face 20 of the display unit side body 3 is a face that faces the operation unit side body 2 in a state where the cellular telephone device 1 is folded.

The display unit 21 displays a variety of information (character information and image information) such as a telephone number of the other party of the conversation, an email address, and email contents. The receiver 22 outputs sound of the other party of the conversation.

In addition, a speaker 61 (see FIG. 2) is provided on a side face of the display unit side body 3. The speaker 61 outputs sound or the like that notifies an incoming call to the cellular telephone device 1.

The hinge mechanism 4 connects the operation unit side body 2 and the display unit side body 3 such that the bodies are relatively moved. The cellular telephone device 1 can be arranged into a state where the operation unit side body 2 and the display unit side body 3 are apart from each other (opened state), and into a state where the operation unit side body 2 and the display unit side body 3 are contacting each other (closed state), by relatively rotating the operation unit side body 2 and the display unit side body 3, which are connected via the hinge mechanism 4.

The cellular telephone device 1 according to the present embodiment has a function of, when a predetermined trigger signal is detected, converting character information into simplified character information composed of sentence elements, or converting simplified character information composed of sentence elements into character information that is not simplified.

Descriptions are hereinafter provided for a configuration and operations for achieving such functions according to the cellular telephone device 1.

Figure 2:
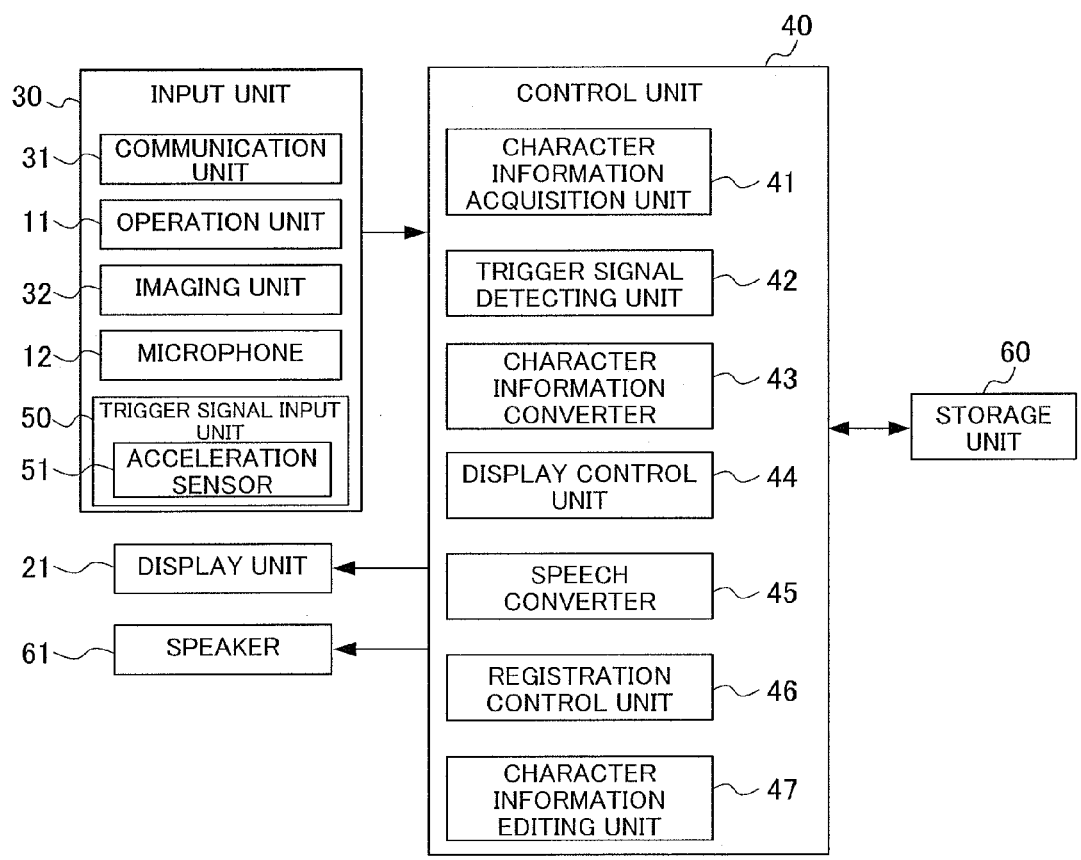
FIG. 2 is a functional block diagram showing a configuration for the cellular telephone device according to the first embodiment to achieve relevant functions.

FIG. 2 is a functional block diagram showing a configuration for the cellular telephone device 1 according to the first embodiment to achieve such functions.

The cellular telephone device 1 includes an input unit 30, a control unit 40, a storage unit 60, a display unit 21 and a speaker 61.

The input unit 30 has a function capable of inputting predetermined information. In the present embodiment, a communication unit 31 capable of inputting web information and email information, the operation unit 11 in which a predetermined input operation is performed, the imaging unit 32 capable of inputting image information, the microphone 12 capable of inputting speech information, and a trigger signal input unit 50 capable of inputting a trigger signal collectively function as the input unit 30.

For example, the trigger signal input unit 50 detects a predetermined input based on displacement, and inputs a trigger signal including information on the displacement into a trigger signal detecting unit 42 to be described later. In the present embodiment, the trigger signal input unit 50 is composed of an acceleration sensor 51. In a case in which acceleration is applied to the cellular telephone device 1 as a result of moving (displacing) the position of the cellular telephone device 1, the acceleration sensor 51 detects the acceleration, and outputs a trigger signal including information on the direction (a displacement direction) in which the acceleration is applied.

The control unit 40 includes a character information acquisition unit 41, a trigger signal detecting unit 42, a character information converter 43, a display control unit 44, a speech converter 45, and a registration control unit 46.

The character information acquisition unit 41 acquires character information, based on information that is input into the input unit 30. More specifically, the character information acquisition unit 41 acquires character information, based on web information and email information acquired via the communication unit 31, image information captured by the imaging unit 32, and speech information that is input via the microphone 12. Moreover, the character information acquisition unit 41 acquires character information that is generated by operating the operation unit 11.

The trigger signal detecting unit 42 detects a predetermined trigger signal. More specifically, based on the trigger signal that is input from the acceleration sensor 51, the trigger signal detecting unit 42 acquires information on a direction (an acceleration direction) in which the acceleration is applied.

In a case in which the trigger signal detecting unit 42 detects a trigger signal, the character information converter 43 extracts sentence elements from the character information, and sorts the sentence elements in a predetermined order, thereby simplifying the character information. More specifically, the character information converter 43 performs a morphological analysis of the character information to divide the sentence into each word, and thereafter extracts sentence elements therefrom.

In addition, in a case in which the trigger signal detecting unit 42 detects a trigger signal, the character information converter 43 converts the simplified character information composed of sentence elements into character information composed of a sentence.

The display control unit 44 displays the character information simplified by the character information converter 43 on the display unit 21. Furthermore, the display control unit 44 displays the character information composed of a sentence converted by the character information converter 43 on the display unit 21.

The speech converter 45 converts character information into speech information. Moreover, the speech converter 45 converts simplified character information into speech information.

The registration control unit 46 registers the simplified character information with a schedule book, a memo pad or an address book stored in the storage unit 60.

The storage unit 60 stores the schedule book, the memo pad or the address book. In addition, the storage unit 60 stores conversion information that is used when converting the simplified character information into the character information.

The display unit 21 is configured with a display device such as a liquid-crystal display panel or an organic EL (Electro Luminescence) panel.

The speaker 61 functions as a speech information output unit, and outputs speech information as sound.

Here, a specific example of operations of the cellular telephone device 1 is described with reference to FIG. 3.

The FIG. 3 is a view showing operations of the cellular telephone device 1 in a case in which the cellular telephone device 1 is shaken in predetermined directions in a state where the received email is displayed on the display unit 21.

As shown in FIG. 3(*a*), when the user shakes the cellular telephone device 1 in a predetermined direction (for example, in a lateral direction) in a state where the received email is displayed on the display unit 21, the acceleration sensor 51 detects acceleration. Furthermore, the acceleration sensor 51 outputs a trigger signal to the trigger signal detecting unit 42. The trigger signal detecting unit 42 detects the trigger signal as a predetermined trigger signal. Then, the character information converter 43 performs a morphological analysis of the text of the received email, and extracts sentence elements from the character information that composes the received email text. In other words, the character information converter 43 extracts sentence elements such as those corresponding to "when", "where", "who", "what", "why" and "how" (five W's one H). Furthermore, the character information converter 43 sorts the extracted sentence elements in a predetermined order.

As shown in FIG. 3(*b*), the display control unit 44 displays the sentence elements (five W's one H) extracted by the character information converter 43 on the display unit 21. It should be noted that, although the display control unit 44 displays only the sentence elements of "when", "where", "who" and "what" on the display unit 21 in the case shown in FIG. 3(*b*), sentence elements to be displayed on the display unit 21 are not limited to those shown in FIG. 3(*b*). Moreover, in the case shown in the FIG. 3(*b*), the character information converter 43 sorts the sentence elements in the order of "when", "where", "who" and "what".

In addition, as shown in FIG. 3(*b*), the display control unit 44 may display the text of the received email (character information), together with the sentence elements (simplified character information), on the display unit 21. In this case, portions extracted as sentence elements in the text of the received email may be displayed in a highlighted manner.

Furthermore, the display control unit 44 may display the start time and the finish time as sentence elements corresponding to "when" on the display unit 21. In this case, the character information converter 43 may perform an analysis such that time (18:00 in FIG. 3(*a*)) that appears firstly in the text of the received email is analyzed as the start time, and time (20:00 in FIG. 3(*a*)) that appears secondly in the text is analyzed as the finish time.

Subsequently, when the user shakes the cellular telephone device 1 in a predetermined direction (for example, in the lateral direction), the acceleration sensor 51 detects acceleration, and outputs a trigger signal to the trigger signal detecting unit 42. The trigger signal detecting unit 42 detects a predetermined trigger signal. Then, the registration control unit 46 registers the sentence elements (simplified character information) with the schedule book, the memo pad or the address book stored in the storage unit 60. FIG. 3(*c*) shows a registration screen when the sentence elements are registered with the schedule book. It should be noted that, in the case shown in FIG. 3(*c*), the registration control unit 46 registers the start time and the finish time with the schedule book, as the sentence elements corresponding to "when".

Subsequently, when the user shakes the cellular telephone device 1 in a predetermined direction (for example, in a longitudinal direction), the acceleration sensor 51 detects acceleration, and outputs a trigger signal to the trigger signal detecting unit 42. The trigger signal detecting unit 42 detects a predetermined trigger signal. Then, based on conversion information, which will be described later, and which is stored in the storage unit 60, the character information converter 43 converts the sentence elements (simplified character information), which are stored in the schedule book, the memo pad or the address book, into a sentence (character information).

For example, the storage unit 60 stores conversion information such as "from ... (start time) to ... (finish time)" that are sentence elements corresponding to "when", and sentence information such as "the location is ... " that is a sentence element corresponding to "where". It should be noted that the sentence elements are inserted into the portions of " ... " of such sentence information. In a case in which the trigger signal detecting unit 42 detects a predetermined trigger signal, the character information converter 43 reads sentence elements that are registered with the schedule book, the memo pad or the address book, reads conversion information that is stored in the storage unit 60, and inserts the sentence elements into the conversion information. More specifically, in a case in which the start time (18:00) and the finish time (20:00) are registered as sentence elements corresponding to "when", and "from ... (finish time) to ... (start time)" is stored as conversion information corresponding to "when", the character information converter 43 inserts the sentence elements into the conversion information to create a sentence "from 18:00 to 20:00". Furthermore, in a case in which "the conference room A" is registered as a sentence element corresponding to the "location", and "the location is ... " is stored as conversion information corresponding to the "location", the character information converter 43 inserts the sentence element into the conversion information to create a sentence "the location is the conference room A".

As described above as an example, by converting sentence elements into a sentence, the character information converter 43 converts, for example, the schedule registration information as shown in the FIG. 3(*c*) into a sentence as shown in the FIG. 3(*b*).

It should be noted that the conversion information may have a plurality of patterns such as a pattern to be converted into a sentence used in business scenes, a pattern to be converted into a sentence used among friends, a pattern to be converted into a sentence using honorific expressions, and a pattern in which a foreign language is appropriately used, such as a character string "miiting (meeting in a Japanese Katakana character string as an English loanword)" being used instead of a character string "kaigi (conference in a Japanese Kanji character string)". In this case, based on conversion information of a single pattern selected from the plurality of patterns, the character information converter 43 converts a simplified sentence into character information composed of a sentence.

Subsequently, when the user shakes the cellular telephone device 1 in a predetermined direction (for example, in a longitudinal direction), the acceleration sensor 51 detects acceleration, and outputs a trigger signal to the trigger signal detecting unit 42. The trigger signal detecting unit 42 detects a predetermined trigger signal. Then, as shown in FIG. 3(*a*), the display control unit 44 displays only sentences (character information) on the display unit 21.

Next, operations of the cellular telephone device 1 of the present embodiment are described with reference to FIG. 4.

FIG. 4 is a flowchart showing operations of the cellular telephone device 1 of the first embodiment.

At first, in Step S11, the display control unit 44 displays character information acquired by the character information acquisition unit 41 on the display unit 21.

In Step S12, the trigger signal detecting unit 42 determines whether a trigger signal based on detection of acceleration is input from the acceleration sensor 51. In a case in which there is an input from the acceleration sensor 51, the processing advances to Step S13. In a case in which there is no input from the acceleration sensor 51, the processing advances to Step S18.

In Step S13, the trigger signal detecting unit 42 determines whether an acceleration direction based on the trigger signal thus input is a lateral direction. In a case in which the acceleration direction (detection direction) is the lateral direction (YES), the processing advances to Step S14. In a case in which the acceleration direction (detection direction) is the longitudinal direction (NO), the processing advances to Step S17.

In Step S14, the character information converter 43 performs a morphological analysis of the character information acquired by the character information acquisition unit 41, and extracts sentence elements therefrom.

In Step S15, the display control unit 44 sorts the sentence elements in a predetermined order, and displays the sentence elements on the display unit 21.

In Step S16, the display control unit 44 sets highlighting to the character information such that the character information as a basis of sentence elements extracted by the character information converter 43 can be identified, and displays the character information in a highlighted manner on the display unit 21.

In Step S17, the display control unit 44 displays the character information on the display unit 21.

In Step S18, based on an operation by the user, the control unit 40 determines whether to terminate the processing. In a case in which the processing is terminated (YES), the processing is terminated. In a case in which the processing is not terminated (NO), the processing returns to Step S12.

According to the cellular telephone device 1 of the present embodiment, the following effects are achieved.

In the cellular telephone device 1, the character information converter 43 performs a morphological analysis of character information, and extracts sentence elements (simplified character information) therefrom; and the extracted sentence elements are sorted in a predetermined order, and displayed on the display unit 21. Moreover, in the cellular telephone device 1, character information simplified by the character information converter 43 is converted into character information composed of a sentence, and the character information composed of a sentence is displayed on the display unit 21.

As a result, in the cellular telephone device 1, the character information and the simplified character information can be bi-directionally converted. In addition, by confirming the sentence elements, the user can confirm whether the contents of a sentence thus input is correct, and does not need to read the whole text of the character information composed of the sentence. Moreover, by way of a simple operation of the cellular telephone device 1, the user can bi-directionally convert character information and simplified character information, and can register the simplified character information with the schedule book, the memo pad or the address book.

Second Embodiment

Next, the cellular telephone device 1 according to a second embodiment is described.

Since a basic structure of the cellular telephone device 1 according to the present embodiment is the same as the basic structure of the cellular telephone device 1 according to the first embodiment, a description thereof is omitted.

The cellular telephone device 1 according to the present embodiment has a function of, in a case in which a predetermined trigger signal is detected, converting character information into character information including symbols, or converting character information including symbols into character information. It should be noted that, in the following embodiment, a description is provided for a case in which pictograms are used as an example of symbols.

Descriptions are hereinafter provided for a configuration and operations for achieving such functions according to the cellular telephone device 1.

Figure 5:
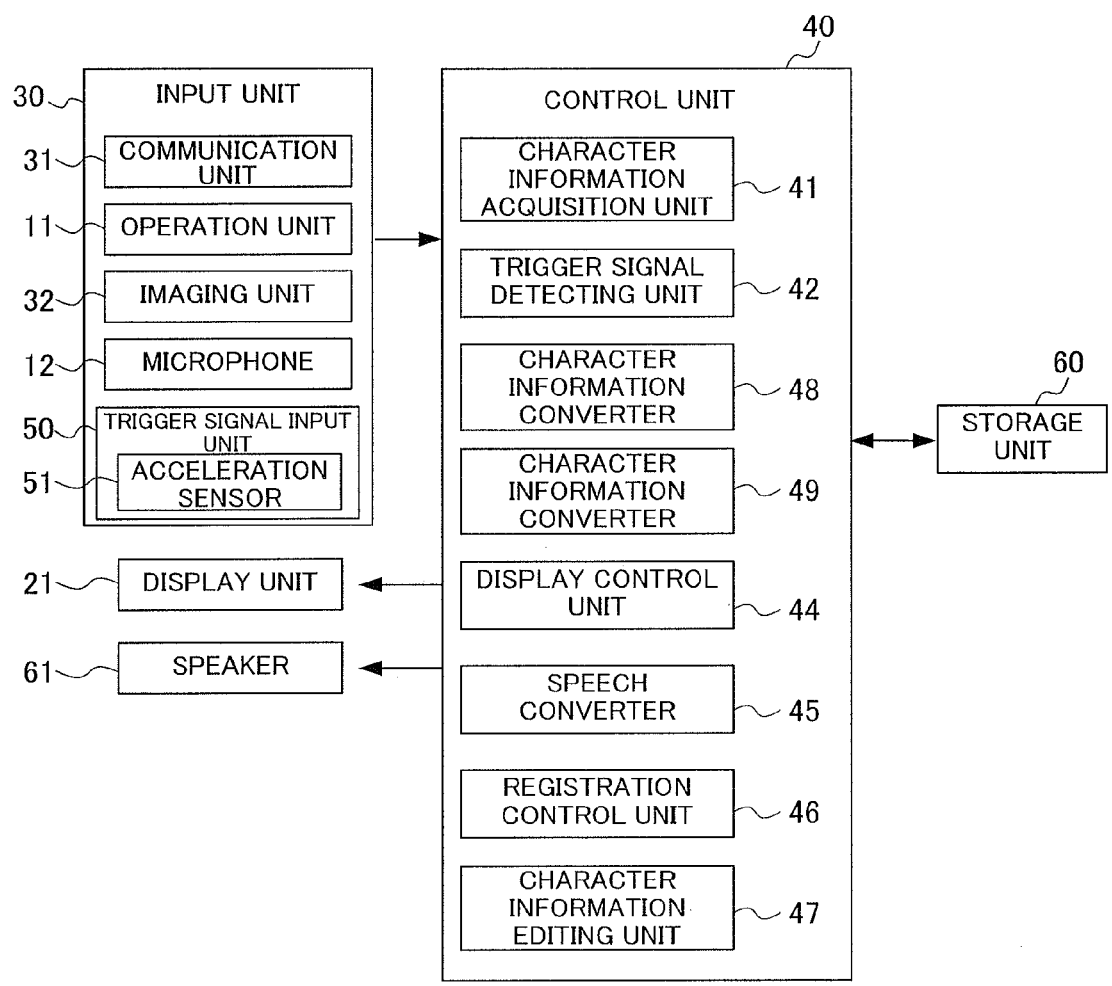
FIG. 5 is a functional block diagram showing a configuration for the cellular telephone device according to a second embodiment to achieve relevant functions.

FIG. 5 is a functional block diagram showing a configuration for the cellular telephone device 1 according to the second embodiment to achieve such functions.

The cellular telephone device 1 includes the input unit 30, the control unit 40, the rigger signal input unit 50, the storage unit 60, the display unit 21, and the speaker 61. Since the configuration of the input unit 30, the trigger signal input unit 50, the display unit 21 and the speaker 61 is the same as the configuration thereof described in the first embodiment, a description thereof is omitted.

The storage unit 60 stores a predetermined word and a pictogram related to the word so as to be associated with each other. Furthermore, the storage unit 60 stores the schedule book, the memo pad or the address book.

The control unit 40 further includes a determination unit 48. The determination unit 48 determines whether a predetermined word is included in character information acquired by the character information acquisition unit 41.

Moreover, in a case in which the determination unit 48 determines that a predetermined word is included in the character information, a character information converter 49 that configures the control unit 40 replaces the predetermined word included in the character information with a pictogram that is stored in the storage unit 60 in association with the word, and generates character information including the pictogram. The character information including the pictogram becomes simplified character information. Moreover, the character information converter 49 converts the character information, which is simplified by replacing a character with a pictogram, into character information composed of a sentence.

It should be noted that, since the configuration of the character information acquisition unit 41, the trigger signal detecting unit 42, the display control unit 44, the speech converter 45 and the registration control unit 46 is the same as the configuration thereof described in the first embodiment, a description thereof is omitted.

Here, a specific example of operations of the cellular telephone device 1 is described with reference to FIG. 6.

FIG. 6 is a view showing operations of the cellular telephone device 1 in a case in which the cellular telephone device 1 is shaken in predetermined directions in a state where received email is displayed on the display unit 21.

As shown in FIG. 6(*a*), when the user shakes the cellular telephone device 1 in a predetermined direction (for example, in the longitudinal direction) in a state where the received email is displayed on the display unit 21, the acceleration sensor 51 detects acceleration. The acceleration sensor 51 outputs a trigger signal to the trigger signal detecting unit 42. The trigger signal detecting unit 42 detects a predetermined trigger signal.

Then, the character information converter 49 searches pictograms, which are included in the received email, for a pictogram that coincides with a pictogram that is stored in the storage unit 60 in association with a predetermined word. Furthermore, in a case in which the received email includes a pictogram that coincides with a pictogram stored in the storage unit 60, the character information converter 49 reads a word that is stored in the storage unit 60 in association with the pictogram, and replaces the pictogram included in the received email with the word that is read from the storage unit 60. For example, the character information converter 49 replaces a pictogram 70 representing "grandfather's face" shown in FIG. 6(*a*) with a word 71 "ji-ji (a Hiragana character string representing grandpa)" shown in FIG. 6(*b*). The display control unit 44 displays sentence information composed of a sentence, in which the pictogram is replaced with the word, on the display unit 21.

Subsequently, as shown in FIG. 6(*b*), in a state where the received email composed of sentences is displayed on the display unit 21, when the user shakes the cellular telephone device 1 in a predetermined direction (for example, in the lateral direction), the acceleration sensor 51 detects acceleration, and outputs a trigger signal to the trigger signal detecting unit 42. The trigger signal detecting unit 42 detects a predetermined trigger signal. Then, the determination unit 48 determines whether a predetermined word that is stored in the storage unit 60 in association with a pictogram is included in the character information acquired by the character information acquisition unit 41.

Moreover, in a case in which the determination unit 48 determines that the predetermined word is included in the character information, the character information converter 49 replaces the predetermined word, which is included in the character information, with a pictogram that is associated with the word, and generates character information including the pictogram. For example, the character information converter 49 replaces the word 71 "ji-ji (a Hiragana character string representing grandpa)" shown in FIG. 6(*b*) with the pictogram 70 representing "grandfather's face" shown in FIG. 6(*a*).

The display control unit 44 displays the character information including the pictogram as simplified character information on the display unit 21.

Next, operations of the cellular telephone device 1 of the present embodiment are described with reference to FIG. 7.

FIG. 7 is a flowchart showing operations of the cellular telephone device 1 of the second embodiment.

Firstly, in Step S21, the display control unit 44 displays received email on the display unit 21.

In Step S22, the trigger signal detecting unit 42 determines whether a trigger signal that is based on detection of acceleration is input from the acceleration sensor 51. In a case in which there is an input from the acceleration sensor 51, the processing advances to Step S23. In a case in which there is no input from the acceleration sensor 51, the processing returns to Step S21.

In Step S23, the trigger signal detecting unit 42 determines whether an acceleration direction (detection direction) that is based on the trigger signal thus input is the longitudinal direction. In a case in which the acceleration direction is the longitudinal direction (YES), the processing advances to Step S24. On the other hand, in a case in which the acceleration direction is the lateral direction (NO), the processing advances to Step S26.

In Step S24, the character information converter 49 searches pictograms, which are included in the received email, for a pictogram that coincides with a pictogram that is stored in the storage unit 60 in association with a predetermined word.

In Step S25, in a case in which the received email includes a pictogram that coincides with a pictogram associated with the predetermined word, the character information converter 49 reads the predetermined word that is stored in association with the pictogram from the storage unit 60, and replaces the pictogram with the predetermined word (text). When the processing in Step S25 is completed, the processing returns to Step S21.

In Step S26, the determination unit 48 performs a search to determine whether the character information composing the received email includes a predetermined word that is stored in the storage unit 60 in association with a pictogram.

In Step S27, in a case in which the character information includes a predetermined word that is stored in the storage unit 60 in association with a pictogram, the character information converter 49 replaces the predetermined word (text), which is included in the character information, with the pictogram corresponding to the predetermined word. When the processing in Step S27 is completed, the processing returns to Step S21.

According to the cellular telephone device 1 of the present embodiment, the following effects are achieved.

In the cellular telephone device 1, a predetermined word included in the character information is replaced with a pictogram, and the character information including the pictogram is displayed as simplified character information on the display unit 21. Moreover, in the cellular telephone device 1, a pictogram included in the simplified character information is replaced with a predetermined word, and is displayed as character information composed of a sentence on the display unit 21. As a result, in the cellular telephone device 1, the character information and the simplified character information can be bi-directionally converted by the user performing a simple operation.

It should be noted that the present invention is not limited to the aforementioned embodiments, and various modification and improvement are possible. In the present embodiment, a case has been described in which the character information composed of a sentence and the character information including a pictogram are bi-directionally converted by way of a predetermined operation, but it is not limited thereto. In other words, in the cellular telephone device 1, as shown in FIG. 8 as an example, in a case in which a pictogram and a predetermined word are bi-directionally converted, it is also possible to set conversion levels at a plurality of stages.

FIG. 8 is a view showing operations of the cellular telephone device 1 in a case in which the cellular telephone device 1 is shaken in predetermined directions a plurality of times.

As shown in FIG. 8(a), in a state where the received email including pictograms is displayed on the display unit 21, in a case in which the user shakes the cellular telephone device 1 once in the longitudinal direction, the character information converter 49 converts some pictograms into predetermined words by way of an operation similar to the operation described with reference to FIG. 6. For example, the character information converter 49 replaces the pictogram 70 representing "grandfather's face" shown in FIG. 8(a) with the word 71 "ji-ji (a Hiragana character string representing grandpa)" shown in FIG. 8(b).

Furthermore, in a case in which the user shakes the cellular telephone device 1 once more in the longitudinal direction, the character information converter 49 converts some other pictograms into predetermined words. For example, the character information converter 49 converts a pictogram 72 representing "school" shown in FIG. 8(b) into a word 73 "school" shown in FIG. 8(c).

Furthermore, in a case in which the user shakes the cellular telephone device 1 once more in the longitudinal direction, the character information converter 49 converts some other pictograms into predetermined words. For example, the character information converter 49 converts a pictogram 74 (musical note) representing "feeling happy" shown in FIG. 8(c) into a phrase 75 "feeling happy" shown in FIG. 8(d).

Furthermore, in a case in which the user shakes the cellular telephone device 1 in the lateral direction, the character information converter 49 converts some words into pictograms in a stepwise manner.

FIG. 9 is a state transition diagram when converting characters/pictograms in a case of setting conversion levels at a plurality of stages. FIG. 10 is a diagram showing pictogram/word conversion tables.

As shown in FIG. 9, when email or web is activated, the email or the web is displayed on the display unit 21. At this point in time, the display unit 21 displays character information including pictogram as shown in FIG. 8(a). Subsequently, when the cellular telephone device 1 is shaken in the longitudinal direction, the character information converter 49 converts some pictograms into predetermined words (text), based on a corresponding table for words and pictograms (a state-1 conversion table shown in FIG. 10(a)) stored in the storage unit 60. As a result, the cellular telephone device 1 enters a state 1 of displaying a screen as shown in FIG. 8(b). On the other hand, when the cellular telephone device 1 is shaken in the lateral direction in a case in which the cellular telephone device 1 is in the state 1, the character information converter 49 converts predetermined words (text) into pictograms, based on the state-1 conversion table.

Moreover, when the cellular telephone device 1 is shaken in the longitudinal direction in a case in which the cellular telephone device 1 is in the state 1, the character information converter 49 converts some pictograms into predetermined words (text), based on a corresponding table for words and pictograms (a state-2 conversion table shown in FIG. 10(b)) stored in the storage unit 60. As a result, the cellular telephone device 1 enters a state 2 of displaying a screen as shown in FIG. 8(c). On the other hand, when the cellular telephone device 1 is shaken in the lateral direction in a case in which the cellular telephone device 1 is in the state 2, the character information converter 49 converts predetermined words (text) into pictograms, based on the state-2 conversion table.

Furthermore, when the cellular telephone device 1 is shaken in the longitudinal direction in a case in which the cellular telephone device 1 is in the state 2, the character information converter 49 converts some pictograms into predetermined words (text), based on a corresponding table for words and pictograms (a state-3 conversion table shown in FIG. 10(c)) stored in the storage unit 60. As a result, the cellular telephone device 1 enters a state 3 of displaying a screen as shown in FIG. 8(d). On the other hand, when the cellular telephone device 1 is shaken in the lateral direction in a case in which the cellular telephone device 1 is in the state 3, the character information converter 49 converts predetermined words (text) into pictograms, based on the state-3 conversion table.

In this way, by including the plurality of conversion tables, the cellular telephone device 1 performs bi-directional conversion of pictograms and predetermined words at the plurality of stages. As a result, the user can perform bi-directional conversion of pictograms and predetermined words in accordance with the skill level for using pictograms, and the user can easily understand the meaning of character information including pictograms.

It should be noted that, in the present embodiment, a case has been described in which pictograms included in the subject and text of the received email are converted into predetermined words, but it is not limited thereto. In other words, in a case in which a pictogram(s) is included in information such as character information acquired via the communication unit 31 (web), character information acquired based on an operation via the operation unit 11, character information acquired by using the imaging unit 32, and character information acquired via the microphone 12, the character information converter 49 can convert such a pictogram(s) into a predetermined word(s). Moreover, in a case in which a predetermined word(s) is included in information such as character information acquired via the communication unit 31 (web), character information acquired based on an operation via the operation unit 11, character information acquired by using the imaging unit 32, and character information acquired via the microphone 12, the character information converter 49 can convert such a predetermined word(s) into pictogram(s).

Modified Embodiment

It should be noted that the present invention is not limited to the first and second embodiments, and modification, improvement and the like within a range that can achieve the object of the invention are included in the present invention.

In the aforementioned embodiments, the trigger signal detecting unit 42 detects a predetermined trigger signal based on shaking of the cellular telephone device 1 in the lateral direction or the longitudinal direction, but it is not limited thereto. In other words, in the cellular telephone device 1, in a case in which the trigger signal detecting unit 42 detects a first trigger signal based on displacement of the cellular telephone device 1 in a first predetermined direction, character information composed of a sentence may be converted into simplified character information. Moreover, in the cellular telephone device 1, in a case in which the trigger signal detecting unit 42 detects a second trigger signal based on displacement of the cellular telephone device 1 in a second predetermined direction that is different from the first predetermined direction, simplified character information may be converted into character information composed of a sentence. Therefore, for example, in a case in which the first predetermined direction is a right direction, the second predetermined direction may be a left direction. In addition, in a case in which the first predetermined direction results in a circle rotating to the right, the second predetermined direction may result in a circle rotating to the left.

Furthermore, in the aforementioned embodiments, a case has been described in which the cellular telephone device 1 is shaken in a predetermined direction, then character information composed of a sentence is converted into simplified character information, or simplified character information is converted into character information composed of a sentence, but it is not limited thereto. In other words, in a case in which the cellular telephone device 1 is shaken in a predetermined direction a predetermined number of times within a predetermined period of time, the character information converter 43, 49 may perform bi-directional conversion of character information composed of a sentence and simplified character information.

In this case, the number of times of shaking in a predetermined direction may be varied between: a case in which character information is simplified by extracting sentence elements from the character information, and sorting the sentence elements in a predetermined order; and a case in which character information composed of a sentence is simplified by replacing a predetermined word(s) included in the character information with a pictogram(s) that is associated with the word. For example, the character information converter 43 may simplify character information by extracting sentence elements from the character information, and sorting the sentence elements in a predetermined order, based on the fact that the cellular telephone device 1 was shaken once in the lateral direction within a predetermined period of time. Moreover, the character information converter 49 may simplify character information composed of a sentence by replacing a predetermined word(s) included in the character information with a pictogram(s) that is associated with the word, based on the fact that the cellular telephone device 1 was shaken twice in the lateral direction within a predetermined period of time.

In addition, in the aforementioned embodiments, a case has been described in which the acceleration sensor 51 is used as the trigger signal input unit 50, but it is not limited thereto. In other words, the trigger signal input unit 50 may be a contact sensor. The contact sensor detects a moving direction (a displacement direction) of an external object (for example, a user's finger, etc.) that moves (is displaced) on a surface of a detecting body (for example, a touch panel, etc.), and inputs a trigger signal including information on the moving direction into the trigger signal detecting unit 42. In this case, the trigger signal detecting unit 42 acquires information on the moving direction, based on the trigger signal that is input.

Furthermore, the trigger signal input unit 50 may be a speech recognition unit. In a case in which sound is input, the speech recognition unit recognizes the sound, converts the sound into text data, and inputs the text data into the trigger signal detecting unit 42. In this case, in a case in which predetermined text is included in the text that composes the text data thus input, the trigger signal detecting unit 42 detects such predetermined text as a predetermined trigger signal.

Moreover, the trigger signal input unit 50 may also serve as the operation unit 11. In this case, long pressing of a predetermined key or consecutive pressing of a same key twice within a predetermined period of time in the operation unit 11 may be set as a trigger signal. It should be noted that the user may be able to set an arbitrary depression operation in the operation unit 11 as a trigger signal.

In addition, in the aforementioned embodiments, a case has been described in which simplified character information is displayed on the display unit 21, but it is not limited thereto. In other words, the control unit 40 may include a character information editing unit 47 that edits simplified character information in accordance with an operation by the user. As a result, in a case in which simplified character information is required to be edited, the character information editing unit 47 edits the simplified character information, based on an operation of the operation unit 11 or the like by the user.

Furthermore, in the aforementioned embodiments, a case has been described in which simplified character information is displayed on the display unit 21 such that simplified character information and character information composed of a sentence are displayed in the same font size, but it is not limited thereto. In other words, the display control unit 44 may display the simplified character information in a font size that is larger than a font size of the character information composed of a sentence, on the display unit 21. By displaying in a large font, the visibility can be improved.

Moreover, in the aforementioned embodiments, a case has been described in which the character information converter 43, 49 converts simplified character information into character information composed of a sentence, and thereafter, the display control unit 44 displays the character information composed of a sentence on the display unit 21, but it is not limited thereto. In other words, in a case in which an arbitrary message other than simplified character information is added by the control unit 40 based on an operation by the user, the character information converter 43, 49 converts the simplified character information into character information composed of a sentence, and thereafter, the display control unit 44 may display the message thus added, together with the character information composed of a sentence, on the display unit 21.

In addition, the display unit 21 may display character information simplified by the character information converter 43, 49, and at least a part of selection candidates for selecting processing details associated with the character information. In this case, the processing details can include any one of: a function of editing the character information; a function of transmitting the character information or character information edited from the character information through an email function; and a text-to-speech reading function of reading character information as speech.

Furthermore, in the aforementioned embodiments, the cellular telephone device 1 of a so-called flip type is described as an example of the portable electronic device, in which the operation unit side body 2 and the display unit side body 3 are relatively moved via the hinge mechanism 4, but it is not limited thereto. In other words, the cellular telephone device may be of: a slider type in which one body slides to one direction from a state in which the operation unit side body and the display unit side body are mutually superimposed; a rotating type in which one body is rotated around an axis line along the superimposing direction; or a straight type in which the operation unit side body and the display unit side body are disposed in a single body.

Moreover, in the aforementioned embodiments, the present invention is applied to the cellular telephone device 1 as a portable electronic device, but it is not limited thereto. In other words, the present invention may be applied to other portable electronic devices such as a personal digital assistant (PDA), a notebook computer, a digital camera and a small-sized audio player.

Figure 11:
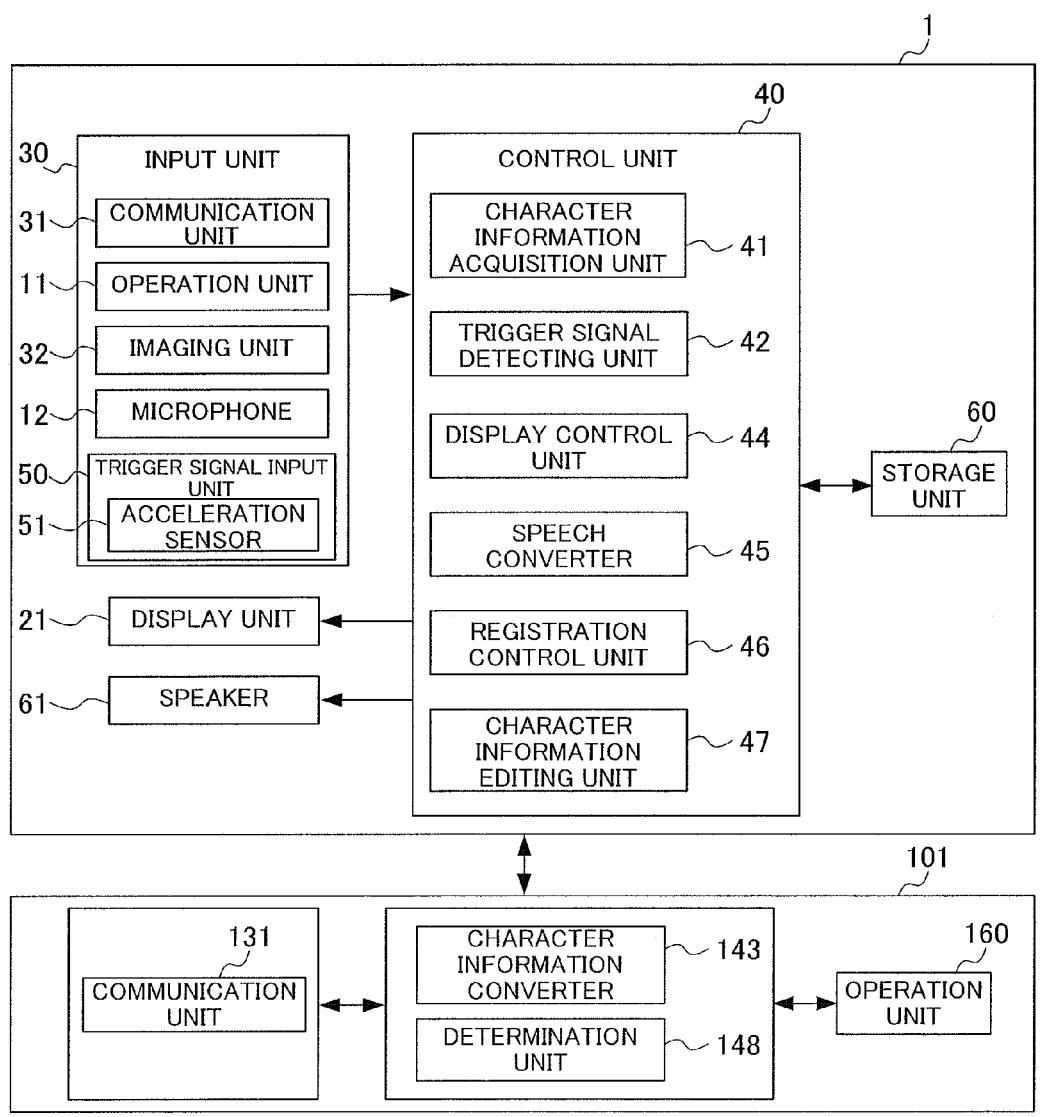
FIG. 11 is a block diagram showing a system configuration according to another embodiment of the present invention.

In addition, in the aforementioned embodiments, a case has been described in which the portable electronic device 1 includes the character information converter 43, 49, but alternatively, as shown in FIG. 11, a character information converter 143 may be disposed in an external arithmetic unit 101 that includes a server function and the like. In this case, the cellular telephone device 1 transmits character information to be converted, and the fact that a predetermined trigger signal for converting the character information was detected, to the external arithmetic unit 101 via the communication unit 31 on the cellular telephone device 1 side and a communication unit 131 on the external arithmetic unit 101 side. In addition, the character information converter 143 of the external arithmetic unit 101 converts the character information. Furthermore, the external arithmetic unit 101 transmits the converted character information to the cellular telephone device 1 via the communication unit. It should be noted that units such as a determination unit 148 that performs determination required for converting character information, and a storage unit 160 that stores information required for such processing may also be disposed in the external arithmetic unit 101. In this way, an aspect of disposing the character information converter 143 in the external arithmetic unit 101 including a server function and the like can be applied to any of the aforementioned embodiments. In addition, providing the character information converter 143 to the external arithmetic unit 101 has an advantage such as the arithmetic processing rate of the external arithmetic unit being higher than the arithmetic processing rate of the cellular telephone device 1.

The invention claimed is:

1. A portable electronic device, comprising:
    a display unit;
    a trigger signal detecting unit that detects a first trigger signal based on displacement of the mobile electronic device in a first direction, and a second trigger signal based on displacement of the mobile electronic device in a second direction that is different to the first direction;
    a character information converter that, in a case in which the trigger signal detecting unit detects the first trigger signal, when a predetermined word is included in the sentence displayed on the display unit, converts the sentence to a simplified sentence by replacing a predetermined word with a pictogram associated with the predetermined word, and in a case in which the trigger signal detecting unit detects the second trigger signal, when the simplified sentence is displayed on the display unit, converts the simplified sentence into the sentence, by replacing the predetermined word with the pictogram;
    a display control unit that displays the simplified sentence that has been converted by the character information converter, or the sentence that has been converted by the character information converter on the display unit; and
    a character information editing unit that edits the simplified sentence
    a display control unit that displays any one of the first or third character information that has been converted by the character information converter, within a same area as the predetermined word was displayed; and
    a character information editing unit that edits the simplified character information.

* * * * *